United States Patent
Bignion et al.

(10) Patent No.: US 6,513,466 B2
(45) Date of Patent: Feb. 4, 2003

(54) TWO-STROKE ENGINE

(75) Inventors: Edgar Bignion, Hockenheim (DE); Matthias Mugele, Karlsbad (DE); Jan Tribulowski, Weingarten (DE); Axel Klimmek, Schwaikheim (DE)

(73) Assignee: Andreas Stihl AG & Co., Waiblingen (DE)

(*) Notice: Subject to any disclaimer, the term of this patent is extended or adjusted under 35 U.S.C. 154(b) by 0 days.

(21) Appl. No.: 09/884,017

(22) Filed: Jun. 20, 2001

(65) Prior Publication Data

US 2002/0000211 A1 Jan. 3, 2002

(30) Foreign Application Priority Data

Jun. 24, 2000 (DE) .......................................... 100 30 969

(51) Int. Cl.<sup>7</sup> ............................................... F02B 33/04
(52) U.S. Cl. ................... 123/73 A; 123/73 PP; 123/73 V
(58) Field of Search ............................. 123/73 A, 73 V, 123/73 PP, 73 D, 65 V (56) References Cited

U.S. PATENT DOCUMENTS 5,105,775 A * 4/1992 Maissant ................... 123/70 R
5,771,849 A   6/1998 Hamy ........................ 123/73

FOREIGN PATENT DOCUMENTS

| EP | 0 785 347 | 7/1997 | |
| EP | 0 971 110 | 1/2000 | |
| JP | 55117031  | * 9/1980  | ........... F02B/33/04 |
| JP | 57183520  | 11/1982 | |
| JP | 09268918  | 10/1997 | |

* cited by examiner

*Primary Examiner*—Willis R. Wolfe
(74) *Attorney, Agent, or Firm*—Walter Ottesen (57) ABSTRACT

The invention relates to a two-stroke engine in the form of a drive motor in a motor-driven chain saw or like portable handheld work apparatus. A combustion chamber (4) is provided in a cylinder (2) of the engine and is delimited by a piston (1). The piston (1) drives a crankshaft (6) via a connecting rod (5) and the crankshaft (6) includes a crank-web (7). The combustion chamber (4) is connected via an outlet to an exhaust-gas muffler. A fresh mixture is supplied to the combustion chamber (4) from the crankcase (3) via a transfer channel (10). The entry of the fresh mixture takes place via the crankcase (3). Also, an air channel (21) is provided for supplying fuel-free air. To reduce the scavenging losses, the air channel (21) is connected via a storage space (20) to the crankcase (3). The transfer channel (10) is either connected directly via a valve (23) to the crankcase or indirectly via the storage space (20).

16 Claims, 4 Drawing Sheets

TWO-STROKE ENGINE

FIELD OF THE INVENTION

The invention relates to a two-stroke engine and especially a two-stroke engine in the form of a drive motor in a portable handheld work apparatus such as a motor-driven chain saw, brushcutter, cutoff machine or the like.

BACKGROUND OF THE INVENTION

Two-stroke engines of the above kind are generally known. To reduce the system-caused scavenging losses when exchanging charge, it has already been suggested to advance fuel-deficient or fuel-free air in advance of the inflow of the fresh mixture into the combustion chamber so that the scavenging losses are essentially formed by the fuel-free gas. The scavenging losses are unavoidable because of the open outlet which is slot controlled.

To introduce the advance air it is known to provide that the air channel opens into the transfer channel close to the transfer windows so that, during the induction phase, because of the underpressure in the crankcase, not only the mixture is drawn in via the inlet but, at the same time, fuel-free air flows in via the air channel from the transfer window in the direction toward the crankcase. At the start of a scavenging cycle, the fresh mixture, which flows in from the crankcase, must first displace the air from the transfer channel into the combustion chamber. The advance air, which is drawn in during an induction phase, is displaced into the combustion chamber for scavenging directly following the induction phase.

The constructive complexity for supplying the transfer channels with pure air is considerable. It must be ensured that the residual constituents of the fresh mixture, which are still present in the transfer channel, are scavenged completely by the in-flowing fuel-free air to the crankcase during the induction phase. If parts of the fresh mixture remain in the transfer channel, the scavenging losses are richer in energy and the quality of the exhaust gas deteriorates.

SUMMARY OF THE INVENTION

It is an object of the invention to provide a two-stroke engine which is improved in such a manner that a complete scavenging of the transfer channel with fuel-free air is ensured with less complexity.

The two-stroke engine of the invention includes an engine in a portable handheld work apparatus. The two-stroke engine of the invention includes: a cylinder having a cylinder wall; a piston mounted in the cylinder to undergo a reciprocating movement along a stroke path between top dead center and bottom dead center during operation of the engine; the cylinder and the piston conjointly delimiting a combustion chamber; a crankcase connected to the cylinder; a crankshaft rotatably mounted in the crankcase; a connecting rod connecting the piston to the crankshaft to permit the piston to drive the crankshaft as the piston reciprocates in the cylinder; an outlet for conducting exhaust gases away from the combustion chamber; a transfer channel connecting the crankcase to the combustion chamber; the transfer channel having a first end defining a transfer window lying in the cylinder wall and opening into the combustion chamber; the transfer channel having a second end defining an inflow opening; a mixture-preparation unit for supplying an air/fuel mixture; an inlet in the crankcase downstream of the mixture-preparation unit for conducting the air/fuel mixture into the crankcase; an air channel for supplying an essentially fuel-free gas flow to the crankcase; a storage space in the crankcase; the air channel communicating with the crankcase through the storage space; and, a valve mounted in the crankcase so as to be movable between a first position wherein the inflow opening of the transfer channel is connected directly to said crankcase and a second position wherein the inflow opening is connected indirectly to the crankcase via the storage space.

The air channel supplying essentially fuel-free gas, such as air, opens into the crankcase via a storage space. The air channel advantageously opens in the foot region of the transfer channel at the elevation of the inflow opening into the crankcase. The inflow opening can be flow connected via a valve either directly to the crankcase or indirectly to the crankcase via the storage space.

A control is provided by means of the valve whereby, at the end of a scavenging cycle, the direct connection of the inflow opening of the transfer channel to the crankcase is blocked and an indirect connection is established to the crankcase via the storage space. In the induction phase, the storage space is filled with fuel-free air. For this reason, the fresh mixture, which enters the storage space because of the pressure conditions in the crankcase, displaces the air via the valve into the transfer channel. The transfer channel is completely filled with air from the storage space starting at the inflow opening and extending to the transfer window. All residual constituents of fresh gases, which remain in the transfer channel, are displaced into the combustion chamber. No reversal of the flow direction in the transfer channel is necessary for this scavenging thereof. Before the air, which is displaced into the transfer channel from the storage space, can, in turn, enter into the combustion chamber via the transfer window, the piston has closed the transfer window so that the fuel-free air remains as advance air in the transfer channel. The valve maintains the connection of the inflow opening to the air channel and to the storage space open even in the next induction phase, that is, the transfer channel or the inflow opening thereof continues to be only indirectly connected to the crankcase.

During the induction phase, the storage space again fills with fresh air. The fresh mixture, which has entered into the storage space, is scavenged into the crankcase. When the transfer window opens for the next scavenging cycle, the valve again switches into the second position wherein the inflow opening is connected directly to the crankcase. The fresh is mixture, which passes from the crankcase into the transfer channel, displaces the air, which is stored in the transfer channel from the previous scavenging cycle, into the combustion chamber. It is ensured that the entering advance air is free of fuel-rich residual gases.

A complete scavenging of the transfer channel with fresh air can be guaranteed by the selected constructive configuration and with low complexity without flow reversal. This is essentially achieved in that the advance air is displaced into the transfer channel at the end of a scavenging cycle whereby all residual gases of the previous scavenging cycle are scavenged into the combustion chamber. The advance air of the scavenging cycle remains in the transfer channel and is available for the next scavenging cycle, that is, one work stroke later.

It is practical to provide that the valve is a valve which is controlled in dependence upon the rotational position of the crankshaft. The valve is especially a mechanical multipath valve positively-controlled by the crankshaft. For this purpose, it is advantageous to configure the crankweb as a valve member in the form of a rotating disc.

In a preferred embodiment, the transfer window to the crankcase is opened shortly ahead of the top dead center in order to achieve a longer scavenging of the transfer channel and at about the same time, the storage space is blocked from the crankcase. In this way, fresh air can flow via the valve into the transfer channel toward the crankcase and scavenge residual gases.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
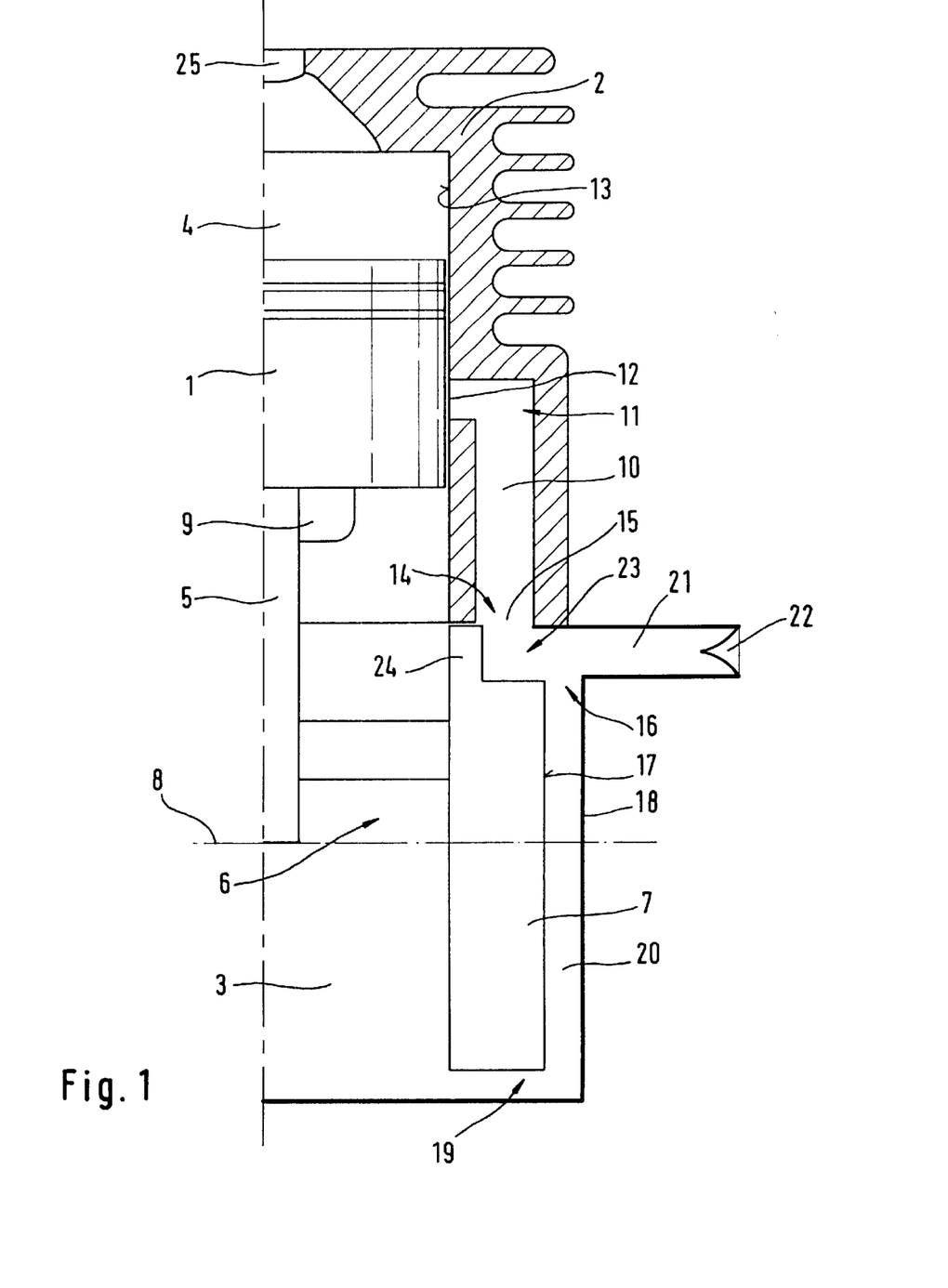
FIG. 1 is a schematic, partially in section, taken through a two-stroke engine according to an embodiment of the invention.

The two-stroke engine shown schematically in FIG. 1 includes essentially a cylinder 2 and a crankcase 3. A combustion chamber 4 is formed in the cylinder 2 and is delimited by a reciprocating piston 1. The piston 1 is connected via a connecting rod 5 to a crankshaft 6 which is rotatably journalled in the crankcase 3 about an axis 8. The crankcase 6 includes, inter alia, a crankweb 7 at an end thereof for weight compensation.

The combustion chamber 4 is connected via an outlet (not shown) to an exhaust-gas muffler or a like exhaust-gas discharging unit. The fresh mixture, which is necessary for the operation, is supplied to the combustion chamber 4 from the crankcase 3. For this purpose, the crankcase 3 is provided with an inlet 9 connected to a mixture-forming device such as a carburetor. The inlet 9 is slot-controlled by the piston 1 in the embodiment shown. It can be practical to configure the inlet 9 as a membrane valve or the like.

The inducted fresh mixture is supplied from the crankcase 3 via a transfer channel 10 to the combustion chamber 4. For this purpose, the transfer channel 10 is provided with a transfer window 12 at its first end 11. The transfer window 12 is formed in the cylinder wall 13. The transfer window 12 is slot-controlled by the piston 1 in the embodiment shown. At its other end 14, the transfer channel 10 opens into the crankcase 3 via an inflow opening 15.

In the embodiment shown, a storage space 20 is configured between the end face 17 of the crankweb 7 and the wall 18 of the crankcase 3. At its one end 19, the storage space 20 communicates with the crankcase 3 and, at its other end 16, with an air channel 21. The air channel 21 conducts fuel-free gas, and especially air, via a membrane valve 22 which opens to the crankcase 3 in flow direction.

Figure 3:
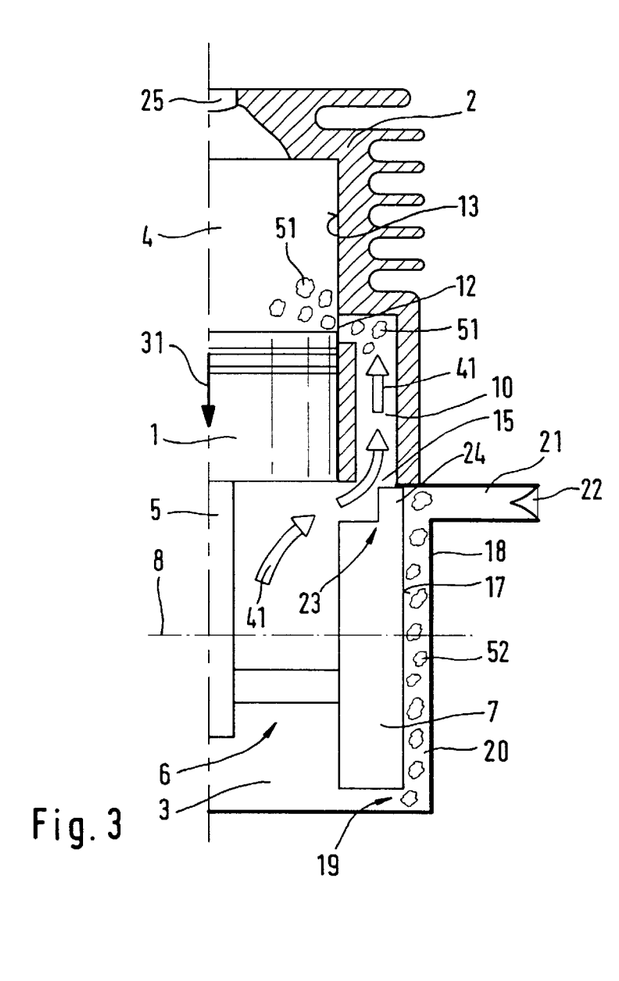
FIG. 3 is a schematic partial section through the two-stroke engine during a scavenging cycle with the transfer window open.

The inflow opening 15, the discharging air channel 21 and the end 16 of the storage space 20 conjointly define a flow connecting junction at which a valve 23 is mounted for switching the flow connections. The inflow opening 15 of the transfer channel 10 is either connected indirectly to the crankcase 3 via the storage space 20 and via the valve 23 or, as shown in FIG. 3, the inflow opening 15 is connected directly to the crankcase 3. The valve 23 is a valve controlled in dependence upon the rotational position of the crankshaft 6. The valve 23 is especially a multipath valve forcibly controlled mechanically by the crankshaft. In the embodiment shown, the crankweb 7 is advantageously formed on its periphery in such a manner that the crankweb 7 itself defines the valve element 24 of the controlled valve 23.

In the embodiment shown, the valve element 24 is configured in the form of a rotating disc. In a first rotational position of the crankweb 7 corresponding to FIG. 3, the valve element 24 separates the inflow opening 15 from the air channel 21 and from the storage space 20 and establishes a direct connection of the transfer channel 10 with the crankcase 3. In this position, the air channel 21 remains connected to the storage space 20 and the air channel lies approximately at the elevation of the inflow opening 15 at the end of the storage space 20.

In a second rotational position of the crankweb 7 according to FIG. 1, the valve 23 lies in its second switching position wherein the inflow opening 15 is blocked by the valve element 24 relative to the crankcase 3 and only an indirect connection to the crankcase 3 is present, namely, via the storage space 20.

The valve configuration is such that, in the first valve position of FIG. 3, the storage space 20 is blocked at its end 16 facing the air channel relative to the crankcase 3 so that the storage space 20 communicates exclusively via the end 19 with the interior space of the crankcase 3. The end 19 lies at the base region of the crankcase 3.

This constructive configuration of the two-stroke engine of FIG. 1 makes possible the operation explained in detail hereinafter.

Figure 2:
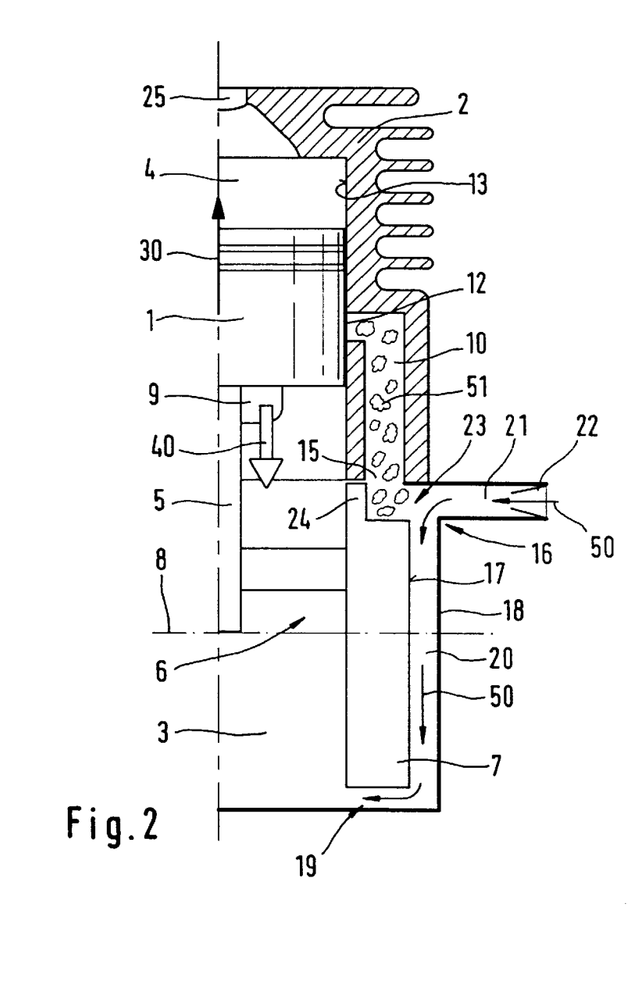
FIG. 2 is a schematic partial section through the two-stroke engine of FIG. 1 for an upwardly moving piston close to top dead center.

In FIG. 2, the piston 1 of the two-stroke engine travels upwards in the direction of arrow 30 toward top dead center. The mixture in the combustion chamber 4 is compressed and is ignited by a spark plug which is mounted in a corresponding receptacle 25 in the cylinder head. Because of the upwardly traveling piston 1, an underpressure develops in the crankcase 3 so that fresh mixture 14 is drawn by suction into the crankcase 3 when the inlet 9 opens. The fresh mixture is formed in a carburetor which is connected via a channel to the inlet 9.

Simultaneously with the inflow of the fresh mixture 14, fuel-free gas, namely air 50, flows via the membrane valve 22 of the air channel 21 to the crankcase in flow direction. This is so because the underpressure, which develops in the crankcase 3, is present also in the air channel 21 via the open end 19 of the storage space 20. Because the transfer window 12 is closed, the flowing gases have no influence on the air volume 51 stored in the transfer channel 10. The nature of the preparation of the air volume 51 will be explained in detail below.

The piston 1 holds the transfer window 12 closed during the upward movement in the direction of arrow 30 toward top dead center; the valve 23 is in its second switching position wherein it connects the inflow opening 15 indirectly to the crankcase 3 via the storage space 20. The valve element 24 blocks a direct connection of the transfer window 15 to the crankcase 3.

At top dead center, the piston 1 reverses its direction of movement. The piston travels downwardly in the direction of arrow 31 toward the crankcase 3.

The valve 23 switches into its first switching position with the downward movement of the piston 1 and the opening transfer window 12 in accordance with FIG. 3. In this first position, the valve element 24 separates the air channel 21 and the storage space 20 from the inflow opening 15. In this switching position, the valve element 24 clears the direct path from the crankcase 3 to the inflow opening 15 of the transfer channel 10. The fresh mixture, which is compressed because of the downward movement of the piston, flows in the direction of arrow 41 via the valve 23 and the inflow opening 15 into the transfer channel 10 and displaces the fuel-free gas, that is, the air 51 from the transfer channel 10 into the combustion chamber 4. Because of the advance air 51, which is essentially free of fuel, the scavenging losses of the fresh mixture can be significantly reduced. Therefore the exhaust gas has good quality.

Because of the switchover of the valve 23 from its second position (shown in FIG. 2) into its first position (FIG. 3), the storage space 20 is also closed at its end 16 relative to the crankcase 3 so that the air 52, which is drawn by suction into the storage space 20 in the induction phase, remains in the storage space 20. The end 16 faces toward the air channel 21. The overpressure is also present in the storage space 20 and in the air channel 21 because of the overpressure in the crankcase 3 and the end 19 of the storage space 20 which is open to the crankcase 3. Because of this pressure, the air supplying membrane valve 22 is closed.

Figure 4:
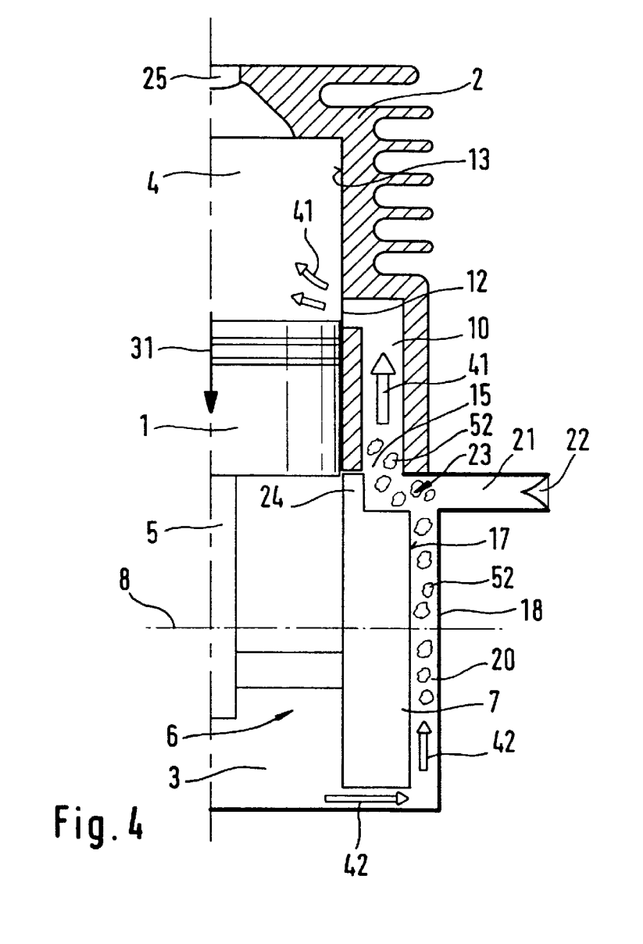
FIG. 4 is a schematic partial section through a two-stroke engine toward the end of a scavenging cycle.
Figure 5:
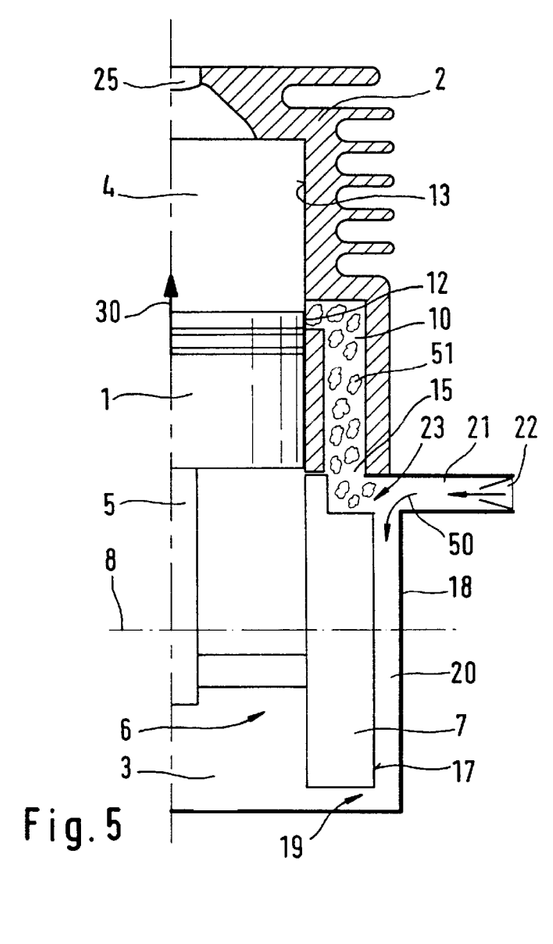
FIG. 5 is a schematic partial section through a two-stroke engine of FIG. 1 wherein the transfer channel is closing at the start of a compression stroke; and, FIG. 6 is a schematic partial section through a two-stroke engine ahead of the end of the compression phase.

Toward the end of a scavenging phase (that is, for a piston still traveling downwardly in the direction of arrow 31 and the open transfer window 12), the valve 23 switches from the first position of FIG. 3 back into the second position of FIG. 2 or FIG. 4. The inflow opening 15 is then separated by the valve element 24 relative to the crankcase 3 and communicates now with the crankcase 3 only via the intermediate space 20. The pressure, which is present in the storage space 20, and the fresh mixture, which flows in the direction of arrow 42 via the open end 19 into the storage space 20, displace the fuel-free air 52 into the transfer channel 10. The fuel-free air 52 had been drawn by suction into the storage space 20. The fresh mixture 41, which is still present in the transfer channel 10, is displaced into the combustion chamber 4 by the after-flowing fuel-free air 52. However, before the after-flowing fuel-free air 52 can enter into the combustion chamber 4, the transfer window 12 is closed by the piston 1 traveling in the direction of arrow 30 in the direction toward top dead center so that the fuel-free air is held in the transfer channel 10 as advance air 51. The fuel-free air is pushed from the storage space 20 into the transfer channel 10 by after-flowing fresh mixture 42. This advance air 51 enters into the combustion chamber 4 only with a next following scavenging cycle. The cycle starting with FIG. 2 repeats itself.

Figure 6:
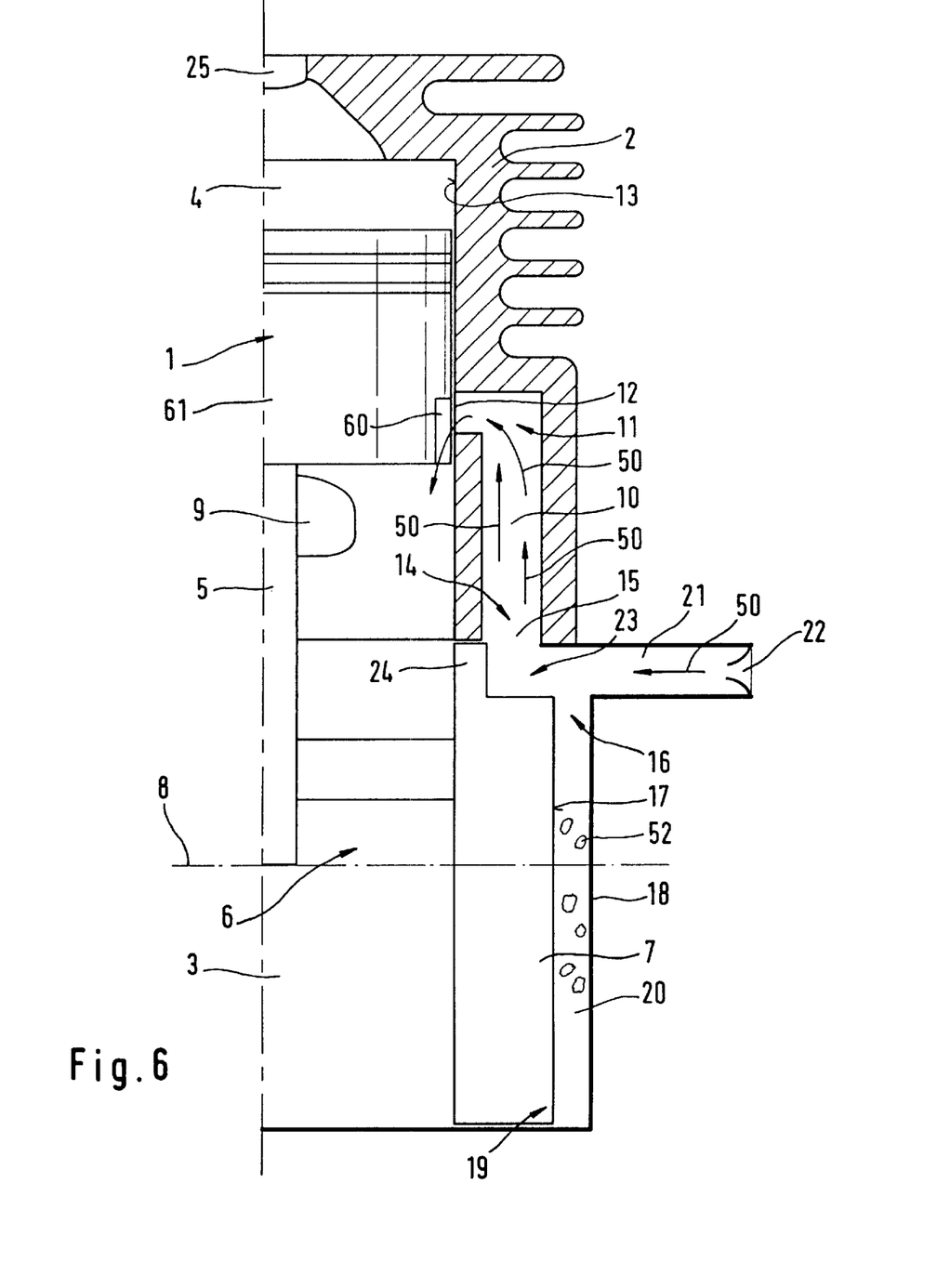

The scavenging can be improved when there is only a short time duration for the scavenging of the transfer channel 10 with fresh air if, just ahead of top dead center, the transfer window 12 is cleared preferably via an opening 60 in the piston skirt 61 or even by the lower edge of the piston as shown in FIG. 6 so that the transfer channel 10 is connected to the crankcase 3. The open end 19 of the storage space 20 is advantageously closed at the time point of the opening of the transfer window 12. Air 50 flows directly through the transfer channel 10 into the crankcase 3 because of the still present pressure difference between the crankcase 3 and the opened membrane valve 22. If one, with suitable measures, configures the crankweb 7 as a pump then, just before top dead center, the fresh air can be pumped out of the storage space 20 into the transfer channel 10. The scavenging of the transfer channel 10 is further improved by this flow movement from the storage chamber 20 through the transfer channel 10 and the transfer window 12 into the crankcase 3.

It is understood that the foregoing description is that of the preferred embodiments of the invention and that various changes and modifications may be made thereto without departing from the spirit and scope of the invention as defined in the appended claims.

What is claimed is:

1. A method for operating a two-stroke engine including an engine in a portable handheld work apparatus, the two-stroke engine including: a cylinder having a cylinder wall; a piston mounted in said cylinder to undergo a reciprocating movement along a stroke path between top dead center and bottom dead center during operation of said engine; said cylinder and said piston conjointly delimiting a combustion chamber; a crankcase connected to said cylinder; a crankshaft rotatably mounted in said crankcase; a connecting rod connecting said piston to said crankshaft to permit said piston to drive said crankshaft as said piston reciprocates in said cylinder; an outlet for conducting exhaust gases away from said combustion chamber; a transfer channel connecting said crankcase to said combustion chamber; said transfer channel having a first end defining a transfer window lying in said cylinder wall and opening into said combustion chamber; said transfer channel having a second end defining an inflow opening; a mixture-preparation unit for supplying an air/fuel mixture; an inlet in said crankcase downstream of said mixture-preparation unit for conducting said air/fuel mixture into said crankcase; an air channel for supplying an essentially fuel-free gas flow to said crankcase; a storage space in said crankcase; said air channel communicating with said crankcase through said storage space; and, a valve mounted in said crankcase so as to be movable between a first position wherein said inflow opening of said transfer channel is connected directly to said crankcase and a second position wherein said inflow opening is connected indirectly to said crankcase via said storage space; the method comprising the steps of:

storing air in said transfer channel toward the end of a scavenging cycle;

at the start of the next scavenging cycle, pushing the stored air as advance air into said combustion chamber with a fresh mixture flowing out from said crankcase; and, said transfer window being opened to said crankcase close to top dead center and said storage space being closed with respect to said crankcase.

2. A method for operating a two-stroke engine including an engine in a portable handheld work apparatus, the two-stroke engine including: a cylinder having a cylinder wall; a piston mounted in said cylinder to undergo a reciprocating movement along a stroke path between top dead center and bottom dead center during operation of said engine; said cylinder and said piston conjointly delimiting a combustion chamber; a crankcase connected to said cylinder; a crankshaft rotatably mounted in said crankcase; a connecting rod connecting said piston to said crankshaft to permit said piston to drive said crankshaft as said piston reciprocates in said cylinder; an outlet for conducting exhaust gases away from said combustion chamber; a transfer channel connecting said crankcase to said combustion chamber; said transfer channel having a first end defining a transfer window lying in said cylinder wall and opening into said combustion chamber; said transfer channel having a second end defining an inflow opening; a mixture-preparation unit for supplying an air/fuel mixture; an inlet in said crankcase downstream of said mixture-preparation unit for conducting said air/fuel mixture into said crankcase; an air channel for supplying an essentially fuel-free gas flow to said crankcase; a storage space in said crankcase; said air channel communicating with said crankcase through said storage space; and, a valve mounted in said crankcase so as to be movable between a first position wherein said inflow opening of said transfer channel is connected directly to said crankcase and a second position wherein said inflow opening is connected indirectly to said crankcase via said storage space; the method comprising the steps of:

storing air in said transfer channel toward the end of a scavenging cycle; and,     at the start of the next scavenging cycle, pushing the stored air as advance air into said combustion chamber with a fresh mixture flowing out from said crankcase.

3. The method of claim 2, wherein said advance air flows into said storage space during the induction phase of said two-stroke engine with the flow of said advance air being in the flow direction toward said crankcase; and, said advance air is displaced out of said storage space and into said transfer channel at the end of said scavenging cycle.

4. A two-stroke engine including an engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

an outlet for conducting exhaust gases away from said combustion chamber;

a transfer channel connecting said crankcase to said combustion chamber;

said transfer channel having a first end defining a transfer window lying in said cylinder wall and opening into said combustion chamber;

said transfer channel having a second end defining an inflow opening;

a mixture-preparation unit for supplying an air/fuel mixture;

an inlet in said crankcase downstream of said mixture-preparation unit for conducting said air/fuel mixture into said crankcase;

an air channel for supplying an essentially fuel-free gas flow to said crankcase;

a storage space in said crankcase;

said air channel communicating with said crankcase through said storage space; and,     a valve mounted in said crankcase so as to be movable between a first position wherein said inflow opening of said transfer channel is connected directly to said crankcase and a second position wherein said inflow opening is connected indirectly to said crankcase via said storage space.

5. The two-stroke engine of claim 1, further comprising a membrane valve for connecting said air channel to said storage space.

6. The two-stroke engine of claim 1, wherein said valve is a valve controlled in dependence upon the rotational position of said crankshaft.

7. The two-stroke engine of claim 6, wherein said valve is a multi-directional valve controlled mechanically by said crankshaft.

8. The two-stroke engine of claim 7, wherein said crankshaft includes a crank web defining said valve.

9. The two-stroke engine of claim 8, wherein said valve is configured as a rotatable disc valve.

10. A two-stroke engine including an engine in a portable handheld work apparatus, the two-stroke engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

an outlet for conducting exhaust gases away from said combustion chamber;

a transfer channel connecting said crankcase to said combustion chamber;

said transfer channel having a first end defining a transfer window lying in said cylinder wall and opening into said combustion chamber;

said transfer channel having a second end defining an inflow opening;

a mixture-preparation unit for supplying an air/fuel mixture;

an inlet in said crankcase downstream of said mixture-preparation unit for conducting said air/fuel mixture into said crankcase:

an air channel for supplying an essentially fuel-free gas flow to said crankcase;

a storage space in said crankcase;

said air channel communicating with said crankcase through said storage space; and,     a valve mounted in said crankcase so as to be movable between a first position wherein said inflow opening of said transfer channel is connected directly to said crankcase and a second position wherein said inflow opening is connected indirectly to said crankcase via said storage space;

said valve being a valve controlled in dependence upon the rotational position of said crankshaft;

said valve being a multi-directional valve controlled mechanically by said crankshaft;

said crankshaft including a crank web defining said valve;

said valve being configured as a rotatable disc valve; and,     said rotatable disc valve defining a flow-connecting point between said inflow opening, said air channel and said storage space.

11. The two-stroke engine of claim 10, said first position, wherein said inflow opening is connected directly to said crankcase, corresponding to a downward movement of said piston and an opening of said transfer window; and, said second position, wherein said inflow opening is connected indirectly to said crankcase through said storage space, corresponding to an upward movement of said piston and a closing of said transfer window.

12. The two-stroke engine of claim 11, wherein said valve is configured so as to cause said air channel to be connected to said storage space in both of said first and second positions.

13. The two-stroke engine of claim 11, said valve being configured so as to essentially close off said storage space to said crankcase in said second position and said air channel being connected by said valve to said crankcase through said transfer channel and said transfer window.

14. The two-stroke engine of claim 13, wherein said piston has a skirt; and, wherein the connection of said air channel to said crankcase in said second position of said valve is facilitated by an opening in said skirt of said piston.

15. The two-stroke engine of claim 11, wherein said storage space has a first end facing toward said air channel; and, said valve closes off said first end of said storage space in said first position.

16. The two-stroke engine of claim 15, wherein said storage space has a second end facing toward said crankcase; and, said second end is closed off to said crankcase in said second position of said valve.

* * * * *

UNITED STATES PATENT AND TRADEMARK OFFICE
CERTIFICATE OF CORRECTION

PATENT NO.    : 6,513,466 B2
DATED         : February 4, 2003
INVENTOR(S)   : Edgar Bignion et al.

It is certified that error appears in the above-identified patent and that said Letters Patent is hereby corrected as shown below:

Column 2,
Line 47, delete "is".

Column 7,
Line 65, delete "claim 1," and substitute -- claim 4, -- therefor.

Column 8,
Line 1, delete "claim 1," and substitute -- claim 4, -- therefor.

Signed and Sealed this

Twenty-sixth Day of August, 2003

JAMES E. ROGAN
*Director of the United States Patent and Trademark Office*